United States Patent [19]
Mullins et al.

[11] Patent Number: 5,517,024
[45] Date of Patent: May 14, 1996

[54] LOGGING-WHILE-DRILLING OPTICAL APPARATUS

[75] Inventors: Oliver C. Mullins, Ridgefield; Xu Wu, Danbury, both of Conn.

[73] Assignee: Schlumberger Technology Corporation, Ridgefield, Conn.

[21] Appl. No.: 402,680

[22] Filed: Mar. 13, 1995

Related U.S. Application Data

[63] Continuation-in-part of Ser. No. 249,430, May 26, 1994.

[51] Int. Cl.⁶ ............................................. G01V 9/04
[52] U.S. Cl. ............................... 250/254; 250/269.1
[58] Field of Search ............................. 250/254, 269.1

[56] References Cited

U.S. PATENT DOCUMENTS

| | | |
|---|---|---|
| 1,746,616 | 2/1930 | Sounitza . |
| 2,206,922 | 7/1940 | Smith .................................. 250/83 |
| 2,241,154 | 5/1941 | Neufeld ............................... 250/83 |
| 2,334,475 | 11/1943 | Claudet ............................. 250/268 |
| 2,346,481 | 4/1944 | Garrison ........................... 250/33.6 |
| 2,944,148 | 7/1960 | Johnson et al. ..................... 250/71 |
| 2,953,979 | 9/1960 | Rosene et al. ........................ 95/11 |
| 2,972,251 | 2/1961 | Harper ................................ 73/154 |
| 4,609,821 | 9/1986 | Summers ........................... 250/255 |
| 4,808,889 | 2/1989 | Darilek .............................. 315/291 |
| 5,134,471 | 7/1992 | Gendron et al. .................. 358/100 |
| 5,140,319 | 8/1992 | Riordan .......................... 340/854.9 |
| 5,166,747 | 11/1992 | Schroeder et al. ............... 250/269.1 |
| 5,351,532 | 10/1994 | Hager .............................. 250/254 |

FOREIGN PATENT DOCUMENTS

WO92/14033  8/1992  WIPO .

*Primary Examiner*—Carolyn E. Fields
*Attorney, Agent, or Firm*—Martin D. Hyden; Leonard W. Pojunas

[57] ABSTRACT

A logging-while-drilling apparatus includes a source of exciting radiation, means for illuminating the borehole wall with the radiation and means for detecting radiation returning from the borehole resulting from illumination with the exciting radiation. A bottom hole assembly (BHA) incorporating such apparatus can comprise a drill bit, one or more stabilizers and one or more drill collars and the source and illuminating and detecting means can be located in one of these or distributed therebetween according to requirements. A window can be provided to allow illumination of the borehole and detection of returning radiation.

48 Claims, 2 Drawing Sheets

LOGGING-WHILE-DRILLING OPTICAL APPARATUS

The present application is a continuation-in-part of application Ser. No. 08/249,430 filed May 26th, 1994 and assigned to Schlumberger Technology Corporation.

FIELD OF THE INVENTION

The present invention relates to logging-while-drilling apparatus for use in optical logging techniques.

BACKGROUND OF THE INVENTION

Several optical logging techniques have been proposed previously for wireline logging applications. Amongst the techniques which have been proposed is fluorescence logging in which the borehole wall is illuminated and fluorescent radiation, typically in the visible/ultra violet range of the spectrum, is detected such as is described in U.S. Pat. Nos. 2,206,922, 2,346,481 and 2,334,475. However, none of these documents describe workable apparatus since, inter alia, none of them appreciate the physically agressive environment that the optical system must endure for fluorescence to be a viable method of detecting hydrocarbons. None of the apparatus described in these documents is applicable to the logging-while-drilling case. Another wireline optical technique which has been proposed for evaluating boreholes is by use of a dowhole camera. Examples of such a technique are described in U.S. Pat. Nos. 2,953,979, 5,134,471, 5,140,319 and WO 92/14033. Since such techniques rely on transmission of visible light, it is essential to fill the borehole with a transparent fluid, typically water or brine, before images can be obtained. Such an approach would not be possible for a logging-while-drilling application since opaque drilling mud is normally used and even when water is used as a drilling fluid, there will be sufficient cuttings and other particulate material suspended therein for visual techniques to be useless. It is also necessary to keep the camera relatively still and stable, something else which is not possible during drilling. U.S. Pat. No. 2,972,251 describes a wireline logging technique which attempts to detect and analyze hydrocarbons by detecting the infrared radiation therefrom. In this case, no attempt is made to account for the fluid filling the borehole which would interfere with such analysis.

It is clear that none of the previously proposed optical logging techniques or apparatus would be applicable to a logging-while-drilling application.

Application Ser. No. 08/249,430 (incorporated herein by reference) describes fluorescence logging-while-drilling apparatus comprising a bottom hole assembly including a light source arranged to illuminate the wall of the borehole at or near the drill bit and a detector to detect fluorescent radiation from the borehole wall at or near the drill bit. A window made of a very hard material such as sapphire is provided through which the source illuminates the borehole and through which the flourescent radiation is detected. The window can be mounted in the drill bit itself, in the blades of a stabilizer or in the wall of a drill collar immediately behind the drill bit.

It is an object of the present invention to provide an aparatus which can be used to allow optical detection and/or analysis techniques to be used during drilling.

SUMMARY OF THE INVENTION

The present invention broadly comprises a logging-while-drilling apparatus including a source of exciting radiation, means for illuminating the borehole wall with the radiation and means for detecting radiation returning from the borehole resulting from illumination with the exciting radiation.

A bottom hole assembly (BHA) incorporating such apparatus can comprise a drill bit, one or more stabilizers and one or more drill collars and the source and illuminating and detecting means can be located in one of these or distributed therebetween according to requirements.

The illuminating and detecting means typically comprises a window mounted in the BHA. The window is preferably made of a very hard but optically transparent material such as sapphire or diamond which can be placed adjacent to and preferably pressed against the borehole wall such that measurements can be made. The window can be mounted in a wear resistant housing, a suitable material for this being polycrystalline diamond compact (PDC) or tungsten carbide. The surface of the window should be subtantially flush with the outer surface of the housing or slightly recessed therefrom. The housing itself should be substantially flush with the portion of the BHA in which it is mounted, but can project slightly therefrom to improve contact with the borehole wall.

The light source can be located within the BHA and connected to the window by suitable light conducting means such as optical fibers. A plurality of windows can be connected to the source, the windows being disposed around the BHA in azimuthal and longitudinal array. While a single light source is most common, multiple sources of different wavelengths or a single source providing multiple wavelength outputs can be used.

The means for detecting and analyzing the returning light depends upon the analytical technique being used. Some suitable techniques are fluorescence analysis, infrared spectroscopy and Raman spectroscopy. The general form of instrumentation, detector and analyzers for these techniques is known.

DESCRIPTION OF THE PREFFERED EMBODIMENT

Figure 1:
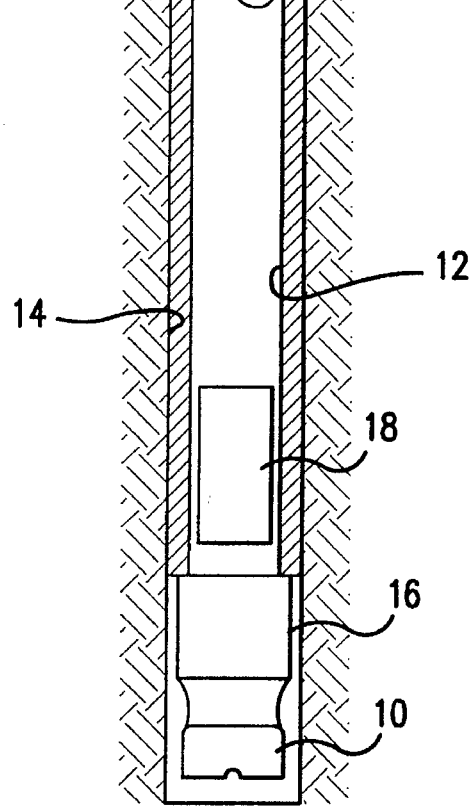
FIG. 1 shows a BHA suitable for logging-while-drilling operations.

FIG. 1 shows a BHA suitable for use in logging-while-drilling operations comprising a drill bit 10 attached to a length of drill collars 12 which form the lower part of a drill string in a borehole 14. One or more stabilizers 16 (one is shown) are located along the drill collars 12, at least one being located close to the drill bit 10. A measurement-while-drilling/logging-while-drilling package 18 is included in the drill collars 12. This package includes power supplies (turbines driven by drilling mud flow, batteries), data processing circuitry, data storage means and data transmission means (mud pulse telemetry devices), and is connected to one or more sensors located in the BHA to make measurements related to the drilling operation such as torque and weight-on-bit, and measurements related to formation evaluation such as formation resistivity, density etc.

In order to be useful for optical formation logging techniques, it is necessary that the BHA include some means by which the formation can be illuminated with exciting radiation from the light source and, just as importantly, radiation returning from the formation can be detected. In wireline logging techniques, this problem can be lessened by filling the borehole with a light transmissive fluid such as water or brine as is done for borehole cameras techniques. However, such an approach is normally not possible during drilling which requires a drilling fluid to be circulated down through the drill string, through the drill bit and back to the surface via the annulus to remove drilled cuttings. Such fluid, often known as mud, is typically a slurry of bentonite clay and barite suspended in water together with other additives to modify the behaviour of the fluid under operating conditions. Thus it will be appreciated that the fluid is relatively opaque, even over short distances of the order of millimeters. Even when water or brine is used as the drilling fluid, the presence of cuttings and suspended solids and formation fluids render the fluid effectively opaque. Therefore, in order to perform optical logging techniques during drilling, it is necessary to have a sensor which can be placed in close proximity to the borehole wall to avoid the interfering effect of drilling fluid. The separation between the sensor and the borehole wall is preferably less than one millimeter and may be nonexistant such that the sensor actually contacts the borehole wall. This reduces the path length of radiation to and from the borehole and so provides less opportunity for signal degradation.

It is not essential that the sensor remain at or on the borehole wall constantly during logging. During drilling, especially in deviated wells, drill collars and stabilizers are generally not in contact with the borehole wall over all of their circumference. However, because of the rotation of the drill string, all parts of the surface come into contact with the formation at some time or other. Consequently, by mounting the sensor at the surface of the BHA, it can be repetitively placed against the borehole wall for a period of time. In logging terms, drilling proceeds relatively slowly and a sensor effectivly will scan a portion of the borehole wall several times. Also the provision of several sensors around the BHA provides several independent measurements of the same part of the borehole wall. By integrating these measurements made of a given portion of wall, it is possible to obtain sufficient information for formation analysis. The motion of the BHA in the borehole during drilling is very violent and mounting sensors at the surface of the BHA can expose them to severe physical conditions. It is important the sensor not be recessed excessively both for the reason of minimizing path length and because mudcake and cuttings tend to accumulate in recesses in the BHA and this would effectively blind an optical sensor.

Figures 2, 3:
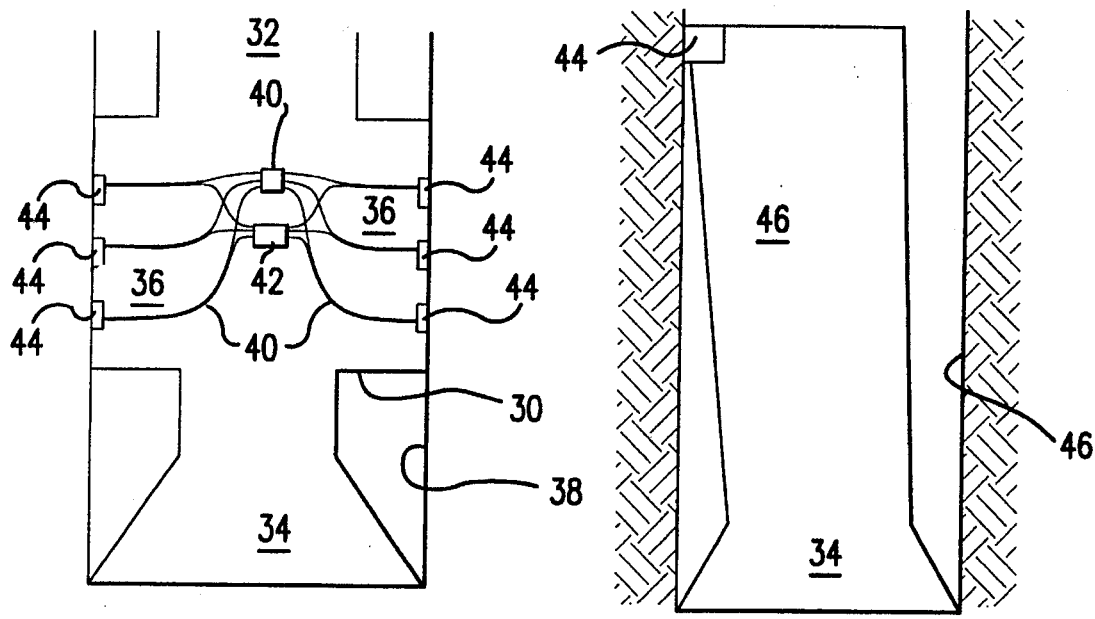
FIGS. 2 and 3 show apparatus according to the present invention for fluorescence logging.
Figure 4:
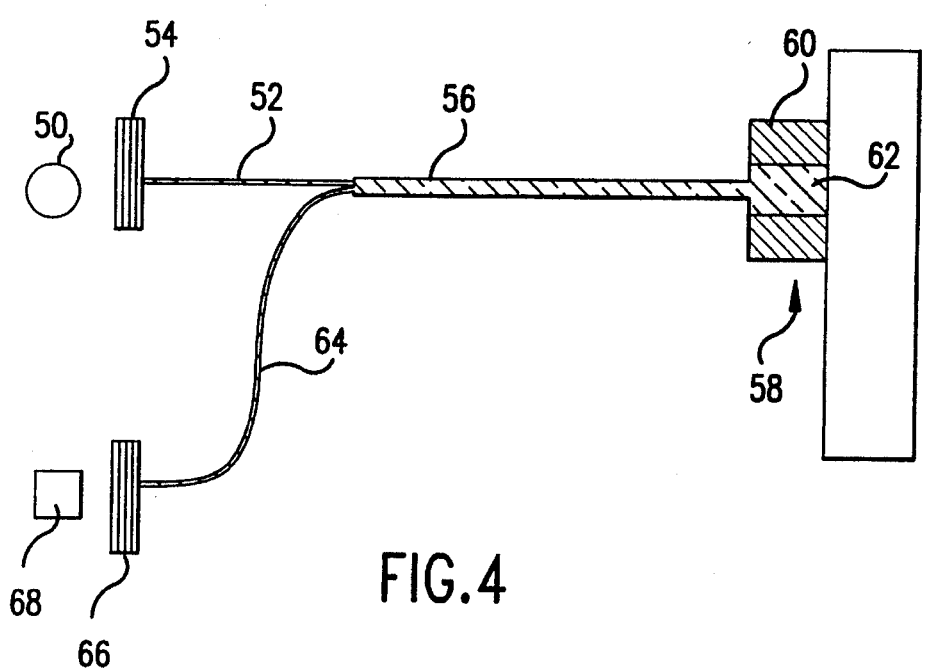
FIG. 4 shows an optical arrangement for use in the present invention.

FIGS. 2 and 3 show apparatus for logging-while-drilling in accordance with the present invention which are described in application Ser. No. 08/249,430. In FIG. 2, the tool body comprises a stabilizer 30 which is positioned in the BHA 32 close to the drill bit 34. The stabilizer includes blades 36 (two shown) which contact the wall of the borehole 38 in order to influence the behavior of the bit 34 during drilling. A light source 40 and detector 42 are located in the BHA 32 and are connected to one or more optical heads 44 located in the stabilizer blades 36 by means of a fiber optic system 46. In the embodiment shown in FIG. 3 the stabilizer is absent and the optical heads 44 are located in the wall of a drill collar 46 forming part of the BHA. It will be appreciated that during drilling, the drill collar 46 will contact the wall of the borehole 38 from time to time and the optical head 44 will be held against the wall by the drill collar 46. In use, the drill string is rotated during drilling such that the optical heads also rotate therewith. Thus the heads will scan the borehole wall circumferentially, at least for the period when the drill collar or stabilizer blade is in contact with the wall, and axially as the drilling progresses and the borehole becomes deeper. Further embodiments have the optical head mounted at the bit or immediately behind the bit. The general optical arrangement applicable to the embodiments shown in FIGS. 2 and 3 is shown in FIG. 4. The light source 50 can comprise a tungsten halogen lamp, e.g. $WI_2$ having a typical power of 10 W and producing light in the UV-visible-near IR with filtering being used to select the desired range, a blue LED having a focused power output of 3 mW and producing light of about 450 nm wavelength, or a laser diode having a power of about 30 mW and producing light of about 674 nm wavelength. A tungsten halogen source will be described here and it will be appreciated that certain aspects of the optical system will be different if another source is used. The light source includes some means of chopping the light which may be electrical or mechanical depending upon the source. Light from the $WI_2$ bulb 50 passes into an optical fiber 52 via a high performance shortpass filter 54 with a passband of 400–500 nm. The optical fiber 52 forms part of a bifurcated fiber bundle 56 which is connected to an optical head (sensor) 58. The optical head is shown in more detail in FIGS. 5 and 6 and comprises a wear resistant housing 60 with a window 62 which is optically connected to the fiber bundle 56. The optical fibers typically comprise high $OH^-$ fibers which have low fluorescence. Scattered or fluorescent light from the formation returns through the window 62 and passes along a further optical fiber 64 forming part of the bundle 56 to a longpass filter 66 having a passband, for example, of 550–750 nm and onto a silicon photodiode detector 68. Other suitable detectors comprise GaAsP detectors, photomultipliers, microchannel plates and GaP detectors. The filter 66 serves to remove any scattered light so that only fluorescent light passes to the detector 68. The detector 68 is connected to suitable circuitry (not shown) such that information can be passed to the surface in an appropriate manner. In a further embodiment, multiple sources are provided for light of differing wavelengths. Also multichannel detectors can be provided for spectroscopic measurements.

Figure 6:
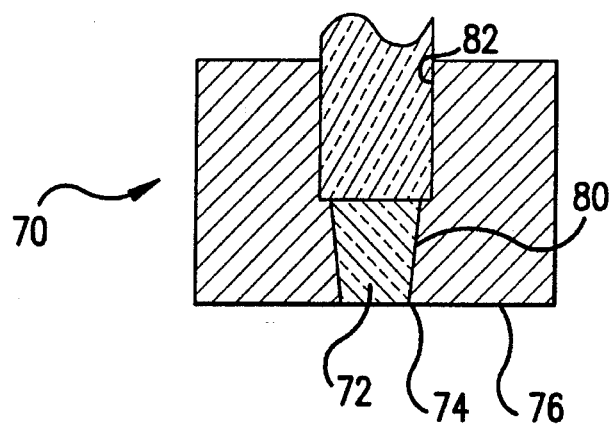
FIGS. 5 and 6 show views of an optical head for use in the present invention.
Figure 5:
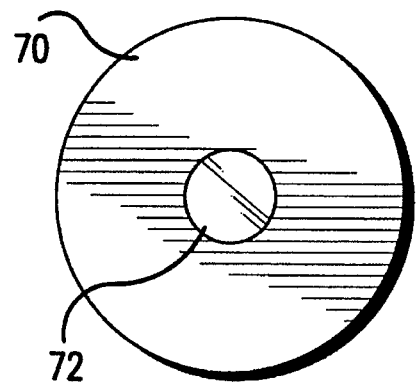

One form of optical head is shown in FIGS. 5 and 6 which is suitable for LWD applications. In LWD it is necessary that the head be able to scan the borehole wall circumferentially as the drill string rotates and axially as the drilling progresses. Consequently, a circular shape as shown in FIG. 5 is used. In a case such as shown in FIG. 2, where the optical head is mounted in a stabilizer blade, the window and head should be flush with the outer surface of the blade. When the optical head is mounted in a drill collar, such as shown in FIG. 3, the head might protrude from the surface by a small amount (e.g. not more than 1 mm) without unduly affecting the durability of the arrangement. FIG. 6 shows a cross section of the head shown in FIG. 5. The window 72 comprises a frusto-conical sapphire insert which is located in a correspondingly shaped recess 80 in the tungsten carbide housing 70 by means of gluing, for example using Emerson & Cuming Inc, Uniset G-757, or brazing. The recess 80 is shaped such that the narrow end is outermost. This is to reduce the likelihood that the window 72 could be ejected from the housing 70 due to shock in use. The window is also secured from being pushed back into the housing due to borehole pressure and the pressure applied to the head to keep the window in contact with the formation and so leave a recess at the surface in which material could build up and mask the borehole optical response. The window should preferably withstand a pressure of 20,000 psi at 400° F. for several hours. The inner end of the recess connects to a bore 82 into which the fiber optic bundle projects. The fibers of the bundle are optically coupled to the window in the usual manner. A further form of window replaces the sapphire or diamond described above with a silicone fluid which is continuously injected through the housing "window" into optical contact with the formation. In this case the housing is pressed against the formation and the window is continuously replaced as the rock surface is scanned.

We claim:

1. Apparatus, comprising a logging-while-drilling apparatus for locating in situ hydrocarbons in underground formations surrounding a borehole, comprising:
   a) a tool body comprising at least one drill collar for connection to a drill string having a drill bit connected at an end thereof;
   b) a source of light in the body arranged to illuminate a wall of the borehole;
   c) a detector arranged to detect radiation from the borehole wall resulting from illumination by the source; and
   d) a window through which the borehole is illuminated and radiation is detected.

2. Apparatus as claimed in claim 1, wherein the tool body comprises a bottom hole assembly.

3. Apparatus as claimed in claim 1, wherein the source of light is selected from the group consisting of visible light sources, ultra violet sources, infrared sources and combinations thereof.

4. Apparatus as claimed in claim 1, wherein the detector detects at least one from the group consisting of visible light, ultra violet light and infrared radiation.

5. Apparatus as claimed in claim 1, wherein the window is made of a wear resistant material.

6. Apparatus as claimed in claim 5, wherein the wear resistant material is sapphire.

7. Apparatus as claimed in claim 1, wherein the window is located in a housing in the tool body.

8. Apparatus as claimed in claim 7, wherein the housing is made from a wear resistant material.

9. Apparatus as claimed in claim 7, wherein the wear resistant material is selected from the group consisting of polycrystalline diamond compact and tungsten carbide.

10. Apparatus as claimed in claim 7, wherein the window is substantially flush with an outer surface of the housing.

11. Apparatus as claimed in claim 10, wherein the housing is substantially flush with the body.

12. Apparatus as claimed in claim 10, wherein the housing projects from the body.

13. Apparatus as claimed in claim 1, wherein the body comprises a stabilizer, the window being located in a blade thereof.

14. A logging-while-drilling apparatus for locating in situ hydrocarbons in underground formations surrounding a borehole, comprising:
   a) a tool body comprising at least one drill collar for connection to a drill string having a drill bit connected at an end thereof;
   b) a source of light in the body arranged to illuminate a wall of the borehole; and
   c) a detector arranged to detect radiation from the borehole wall resulting from illumination by the source.

15. Apparatus as claimed in claim 14, wherein the tool body comprises a bottom hole assembly.

16. Apparatus as claimed in claim 14, wherein the source of light is selected from the group consisting of visible light sources, ultra violet sources, infrared sources and combinations thereof.

17. Apparatus as claimed in claim 14, wherein the detector detects at least one from the group consisting of visible light, ultra violet light and infrared radiation.

18. Apparatus as claimed in claim 14, further comprising a window through which the borehole is illuminated and radiation is detected.

19. Apparatus as claimed in claim 18, wherein the window is made of a wear resistant material.

20. Apparatus as claimed in claim 19, wherein the wear resistant material is sapphire.

21. Apparatus as claimed in claim 18, wherein the window is located in a housing in the tool body.

22. Apparatus as claimed in claim 21, wherein the housing is made from a wear resistant material.

23. Apparatus as claimed in claim 22, wherein the wear resistant material is selected from the group consisting of polycrystalline diamond compact and tungsten carbide.

24. Apparatus as claimed in claim 21, wherein the window is substantially flush with an outer surface of the housing.

25. Apparatus as claimed in claim 21, wherein the housing is substantially flush with the body.

26. Apparatus as claimed in claim 21, wherein the housing projects from the body.

27. Apparatus as claimed in claim 14, wherein the body comprises a stabilizer, the window being located in a blade thereof.

28. Apparatus for logging undergound formations surrounding a borehole during drilling using a bottom hole assembly including a drill bit, comprising:
   a) a source of light in the bottom hole assembly arranged to illuminate the borehole at the drill bit; and
   b) a detector arranged to detect radiation from the borehole at the drill bit.

29. Apparatus as claimed in claim 28, wherein the source of light is selected from the group consisting of visible light sources, ultra violet sources, infrared sources and combinations thereof.

30. Apparatus as claimed in claim 28, wherein the detector detects at least one from the group consisting of visible light, ultra violet light and infrared radiation.

31. Apparatus as claimed in claim 28, further comprising a window through which the borehole is illuminated and radiation is detected.

32. Apparatus as claimed in claim 31, wherein the window is located in a housing in the tool body.

33. Apparatus as claimed in claim 32, wherein the housing is made from a wear resistant material.

34. Apparatus as claimed in claim 33, wherein the wear resistant material is selected from the group consisting of polycrystalline diamond compact and tungsten carbide.

35. Apparatus as claimed in claim 32, wherein the window is substantially flush with an outer surface of the housing.

36. Apparatus as claimed in claim 32, wherein the housing is substantially flush with the body.

37. Apparatus as claimed in claim 28, wherein the window is made of a wear resistant material.

38. Apparatus as claimed in claim 37, wherein the wear resistant material is sapphire.

39. Apparatus for logging undergound formations surrounding a borehole during drilling using a bottom hole assembly including a drill bit, comprising:

a) a source of light in the bottom hole assembly arranged to illuminate the borehole immediately behind the drill bit; and b) a detector arranged to detect radiation from the borehole immediately behind the drill bit.

40. Apparatus as claimed in claim 39, wherein the source of light is selected from the group consisting of visible light sources, ultra violet sources, infrared sources and combinations thereof.

41. Apparatus as claimed in claim 39, wherein the detector detects at least one from the group consisting of visible light, ultra violet light and infrared radiation.

42. Apparatus as claimed in claim 39, further comprising a window through which the borehole is illuminated and radiation is detected.

43. Apparatus as claimed in claim 42, wherein the window is made of a wear resistant material.

44. Apparatus as claimed in claim 43, wherein the wear resistant material is sapphire.

45. Apparatus as claimed in claim 42, wherein the window is located in a housing in the drill bit.

46. Apparatus as claimed in claim 45, wherein the housing is made from a wear resistant material.

47. Apparatus as claimed in claim 46, wherein the wear resistant material is selected from polycrystalline diamond compact and tungsten carbide.

48. Apparatus as claimed in claim 45, wherein the window is substantially flush with an outer surface of the housing.

* * * * *